United States Patent
Kim

(10) Patent No.: US 11,561,191 B2
(45) Date of Patent: Jan. 24, 2023

(54) PRESSURE VESSEL INSPECTION DEVICE AND MONITORING SENSOR USED FOR SAME

(71) Applicants: Hyundai Motor Company, Seoul (KR); Kia Motors Corporation, Seoul (KR)

(72) Inventor: Cheol Hwan Kim, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 0 days.

(21) Appl. No.: 17/034,210

(22) Filed: Sep. 28, 2020

(65) Prior Publication Data
US 2021/0302348 A1  Sep. 30, 2021

(30) Foreign Application Priority Data
Mar. 26, 2020  (KR) .......................... 10-2020-0037134

(51) Int. Cl.
*G01N 17/04* (2006.01)
*F17C 13/02* (2006.01)
*G01N 27/20* (2006.01)

(52) U.S. Cl.
CPC ............. *G01N 27/20* (2013.01); *G01N 17/04* (2013.01)

(58) Field of Classification Search
CPC ................................ G01N 27/20; G01N 17/04
See application file for complete search history.

(56) References Cited

U.S. PATENT DOCUMENTS

| | | | |
|---|---|---|---|
| 11,016,051 B1* | 5/2021 | Sinko ....................... | B32B 5/024 |
| 2012/0255948 A1* | 10/2012 | Kanezaki ................ | F17C 13/02 |
| | | | 220/62.11 |
| 2013/0069630 A1* | 3/2013 | Manson ..................... | G01L 9/08 |
| | | | 324/109 |
| 2013/0134992 A1* | 5/2013 | Zhu ......................... | G01M 3/182 |
| | | | 324/658 |
| 2016/0060794 A1* | 3/2016 | Kohl ....................... | D01D 11/02 |
| | | | 219/388 |
| 2017/0146477 A1* | 5/2017 | Di Sarno .................. | F17C 1/00 |
| 2018/0066797 A1* | 3/2018 | Nakamura ................ | F17C 1/06 |
| 2018/0106429 A1* | 4/2018 | Schmidt .................... | F17C 1/00 |

FOREIGN PATENT DOCUMENTS

| | | | | |
|---|---|---|---|---|
| DE | 10154145 C1 | * | 6/2003 | ............... F17C 1/06 |
| JP | H11230347 | * | 2/1998 | |

* cited by examiner

*Primary Examiner* — Feba Pothen
(74) *Attorney, Agent, or Firm* — Fox Rothschild LLP

(57) ABSTRACT

A pressure vessel inspection device includes: a monitoring sensor including a filament provided on an outer surface of a pressure vessel, a coating layer applied onto an outer surface of the filament so as to have an electrical physical quantity, and electrodes connected to ends of the filament and exposed to outside; and a control unit configured to measure structural health of the pressure vessel based on the electrical physical quantity of the coating layer in accordance with deformation of the pressure vessel, in order to monitor structural health of the pressure vessel and simplify a structure and a manufacturing process.

11 Claims, 15 Drawing Sheets

PRESSURE VESSEL INSPECTION DEVICE AND MONITORING SENSOR USED FOR SAME

CROSS-REFERENCE TO RELATED APPLICATION(S)

This application claims under 35 U.S.C. § 119(a) the benefit of Korean Patent Application No. 10-2020-0037134 filed in the Korean Intellectual Property Office on Mar. 26, 2020, the entire contents of which are incorporated herein by reference.

BACKGROUND

(a) Technical Field

The present disclosure relates to a pressure vessel inspection device and a monitoring sensor used for the same, more particularly, to the pressure vessel inspection device and the monitoring sensor that are capable of SHM (Structural Health Monitoring) of a pressure vessel.

(b) Description of the Related Art

The hydrogen vehicle is configured to produce electricity by a chemical reaction between hydrogen and oxygen and to travel by operating a motor. Typically, the hydrogen vehicle includes a hydrogen tank ($H_2$ tank) configured to store hydrogen ($H_2$), a fuel cell stack configured to produce electricity by an oxidation-reduction reaction between hydrogen and oxygen ($O_2$), various types of devices configured to discharge produced water, a battery configured to store the electricity produced by the fuel cell stack, a controller configured to convert and control the produced electricity, and a motor configured to generate driving power.

A TYPE 4 pressure vessel may be used as the hydrogen tank for a hydrogen vehicle. The TYPE 4 pressure vessel includes a liner made of a nonmetallic material (e.g., plastic), a carbon fiber layer formed to surround an outer surface of the liner, and a fiberglass layer formed to surround an outer surface of the carbon fiber layer.

However, a structural performance of a hydrogen tank may deteriorate due to material degradation as the hydrogen tank approaches a lifespan limit, fatigue may be accumulated due to repeated expansion and contraction caused by charging and discharging of hydrogen, and a structural performance (structural health) of the hydrogen tank may deteriorate when there occurs damage (e.g., scratches or corrosion) to an outer surface of the hydrogen tank due to physical impact or the like.

When the structural health of the hydrogen tank deteriorates as described above, there is an increased risk of occurrence of an accident. Therefore, the structural health of the hydrogen tank needs to be periodically monitored and a hydrogen tank, which does not meet the standard of the structural health, needs to be replaced in a timely manner.

Therefore, in the related art, there has been proposed a method of monitoring the structural health of the hydrogen tank by attaching an FBG (Fiber Bragg Grating) sensor to the outer surface of the hydrogen tank and then detecting a wavelength of light reflected in accordance with a temperature or a strain rate of the attachment point.

However, because a monitoring device using the FBG sensor in the related art requires expensive equipment such as a laser oscillator and a signal analyzer, there is a problem in that a structure thereof is complicated and manufacturing costs are increased.

In addition, the FBG sensor of the monitoring device in the related art is difficult to attach during a process of manufacturing the hydrogen tank (e.g., a process of winding a fiberglass filament), and the FBG sensors need to be customized one by one in accordance with a size and a shape of the hydrogen tank. For this reason, there is a problem in that the manufacturing of the FBG sensor is cumbersome and inconvenient, and manufacturing costs and time are excessively consumed.

Therefore, recently, various types of research are conducted to simplify a structure of the inspection device for monitoring the structural health of the pressure vessel and simplify the process of manufacturing the inspection device, but the results thereof are insufficient. Accordingly, there is a need for development of a technology for simplifying the structure of the inspection device and the manufacturing process.

SUMMARY

The present disclosure provides a pressure vessel inspection device and a monitoring sensor used for the same, which are capable of accurately monitoring structural health of a pressure vessel.

The present disclosure also may simplify a structure and a manufacturing process and reduce costs.

The present disclosure may enable flexible application in accordance with a structure of a pressure vessel and establish an optimum monitoring environment regardless of a shape and a size of a pressure vessel.

The present disclosure may improve safety and reliability and reduce a risk of occurrence of a safety accident.

The present disclosure may accurately predict a lifespan of a pressure vessel and replace a pressure vessel in a timely manner.

In order to achieve the above-mentioned objects of the present disclosure, an aspect of the present disclosure provides a pressure vessel inspection device including: a monitoring sensor including a filament provided on an outer surface of a pressure vessel, a coating layer applied onto an outer surface of the filament so as to have an electrical physical quantity, and electrodes connected to ends of the filament and exposed to outside; and a control unit configured to measure structural health of the pressure vessel based on the electrical physical quantity of the coating layer in accordance with deformation of the pressure vessel.

This is to accurately monitor the structural health of the pressure vessel and simplify the structure and the manufacturing process.

That is, a monitoring device in the related art is configured such that an FBG (Fiber Bragg Grating) sensor is attached to an outer surface of a hydrogen tank, and structural health of the hydrogen tank is monitored by detecting a wavelength of light reflected in accordance with a temperature or a strain rate of the attachment point. Because the monitoring device requires expensive equipment such as a laser oscillator and a signal analyzer, there is a problem in that a structure thereof is complicated and manufacturing costs are increased.

In addition, the FBG sensor of the monitoring device in the related art is difficult to attach during a process of manufacturing the pressure vessel (e.g., a hydrogen tank), and the FBG sensors need to be customized one by one in accordance with a size and a shape of the pressure vessel.

For this reason, there is a problem in that the manufacturing of the FBG sensor is cumbersome and inconvenient and manufacturing costs and time are excessively consumed.

However, according to the exemplary embodiment of the present disclosure, the filament coated with the coating layer having the electrical physical quantity is provided on the outer surface of the pressure vessel, and the structural health of the pressure vessel is measured based on the electrical physical quantity of the coating layer in accordance with the deformation of the pressure vessel. As a result, it is possible to obtain an advantageous effect of accurately monitoring the structural health of the pressure vessel and simplifying the structure and the manufacturing process.

Furthermore, according to the exemplary embodiment of the present disclosure, the monitoring sensor is mounted on the pressure vessel by being wound around the pressure vessel or attached to the pressure vessel by a patch. Therefore, the monitoring sensor may be flexibly applied in accordance with a structure of the pressure vessel regardless of a shape and a size of the pressure vessel, and the monitoring sensor may be mounted during the process of manufacturing the pressure vessel.

The structure and the shape of the pressure vessel may be variously changed in accordance with required conditions and design specifications. As an example, the pressure vessel may include a liner, a carbon fiber layer formed to surround an outer surface of the liner, and a fiberglass layer formed to surround an outer surface of the carbon fiber layer.

According to the exemplary embodiment of the present disclosure, the coating layer may be made of various materials having electrical physical quantities. As an example, the coating layer may be made of a metallic material or a conductive material (e.g., an electrically conductive material with which the outer surface of the filament may be coated).

In particular, the filament including the coating layer may have a constant specific resistance per unit length. Furthermore, the specific resistance per unit length of the filament including the coating layer may be selectively adjusted.

In particular, when the specific resistance per unit length of the filament including the coating layer is constant, the resistance of the filament including the coating layer is proportional to the length of the filament and inversely proportional to a cross-sectional area of the filament.

The arrangement structure of the filament may be variously changed in accordance with required conditions and design specifications.

According to the exemplary embodiment of the present disclosure, the filament may be wound around an outer surface of the fiberglass layer in a circumferential direction of the liner.

According to the exemplary embodiment of the present disclosure, the filament may be provided in a zigzag pattern.

According to the exemplary embodiment of the present disclosure, the pressure vessel inspection device may include a prepreg patch attached to the outer surface of the pressure vessel, and the filament may be provided on the prepreg patch.

The prepreg patch may have various structures capable of being attached to the outer surface of the pressure vessel. As an example, the prepreg patch may include first prepreg attached to the outer surface of the pressure vessel; and second prepreg superimposed on the first prepreg, and the filament may be interposed between the first prepreg and the second prepreg so that the electrode is exposed to the outside.

In particular, the prepreg patch may be made of the same material as the fiberglass layer and integrally attached to the outer surface of the fiberglass layer by being thermally cured together with the fiberglass layer when the fiberglass layer is thermally cured.

Since the prepreg patch is made of the same material as the fiberglass layer as described above, the prepreg patch may perform the function of the monitoring sensor while performing the function of the fiberglass layer that maintains structural stability against the high pressure.

The prepreg patch may be attached in various ways in accordance with required conditions and design specifications.

As an example, the prepreg patch may be formed to partially cover the outer surface of the fiberglass layer that corresponds to at least one of the outer surfaces of the body part and the side part that constitute the liner.

As another example, the prepreg patch may be formed to cover the entire outer surface of the fiberglass layer that corresponds to the outer surface of the body part. According to the exemplary embodiment of the present disclosure, the filament may be disposed in a longitudinal direction of the body part or a circumferential direction of the body part.

Another aspect of the present disclosure provides a monitoring sensor including: a filament provided on an outer surface of a test object; a coating layer applied onto an outer surface of the filament so as to have an electrical physical quantity; and electrodes connected to ends of the filament and exposed to outside.

According to the exemplary embodiment of the present disclosure, the filament may be wound around an outer surface of the fiberglass layer in a circumferential direction of the test object.

According to the exemplary embodiment of the present disclosure, the filament may be provided in a zigzag pattern.

According to the exemplary embodiment of the present disclosure, the monitoring sensor may include a prepreg patch attached to the outer surface of the test object, and the filament may be provided on the prepreg patch.

According to the exemplary embodiment of the present disclosure, the prepreg patch may include: first prepreg attached to the outer surface of the test object;

and second prepreg superimposed on the first prepreg, and the filament may be interposed between the first prepreg and the second prepreg so that the electrode is exposed to the outside.

DETAILED DESCRIPTION

Figure 1:
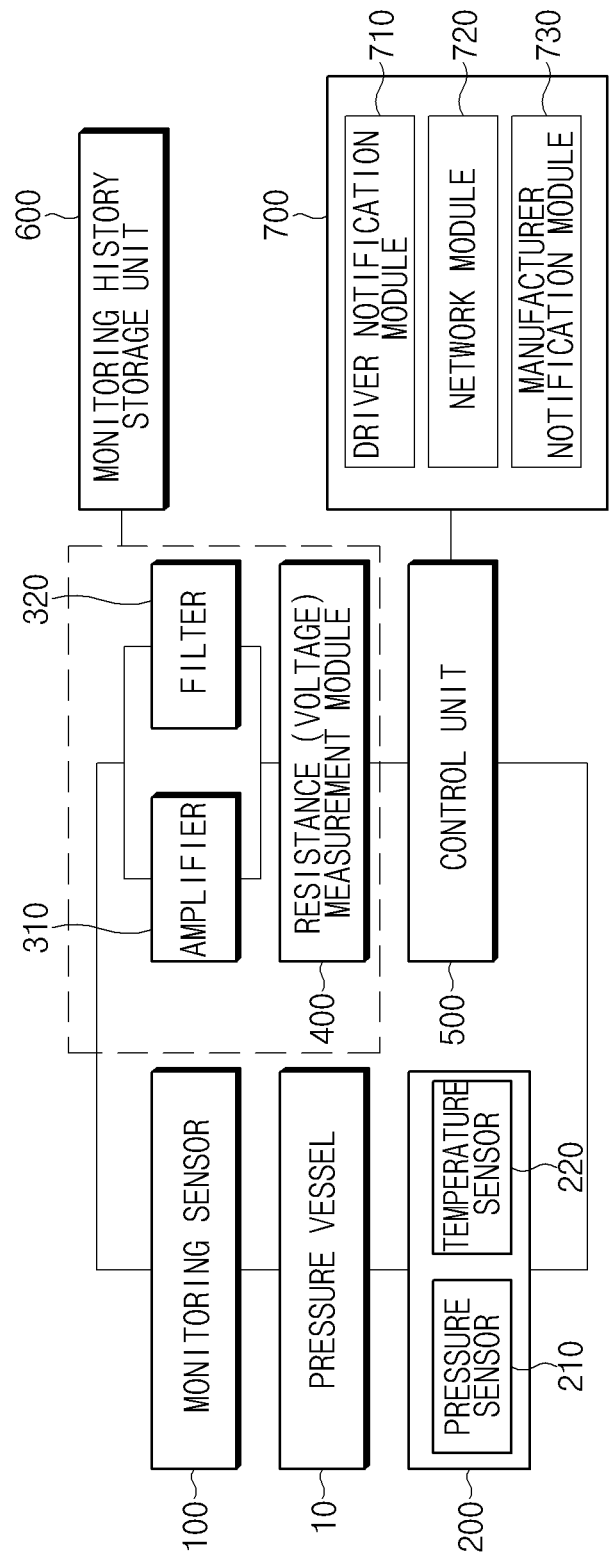
FIG. 1 is a view for explaining a pressure vessel inspection device according to the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, exemplary embodiments of the present disclosure will be described in detail with reference to the accompanying drawings.

However, the technical spirit of the present disclosure is not limited to some exemplary embodiments described herein but may be implemented in various different forms. One or more of the constituent elements in the exemplary embodiments may be selectively combined and substituted within the scope of the technical spirit of the present disclosure.

In addition, unless otherwise specifically and explicitly defined and stated, the terms (including technical and scientific terms) used in the exemplary embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the exemplary embodiment of the present disclosure are for explaining the exemplary embodiments, not for limiting the present disclosure.

Unless particularly stated otherwise in context of the present specification, a singular form may also include a plural form. The explanation "at least one (or one or more) of A, B, and C" described herein may include one or more of all combinations that can be made by combining A, B, and C.

In addition, the terms such as first, second, A, B, (a), and (b) may be used to describe constituent elements of the exemplary embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element can be connected, coupled, or attached directly to another constituent element or connected, coupled, or attached to another constituent element through still another constituent element interposed therebetween.

In addition, the explanation "one constituent element is formed or disposed above (on) or below (under) another constituent element" includes not only a case in which the two constituent elements are in direct contact with each other, but also a case in which one or more additional constituent elements are formed or disposed between the two constituent elements. In addition, the expression "up (above) or down (below)" may include a meaning of a downward direction as well as an upward direction based on one constituent element.

Referring to FIGS. 1 to 15, a pressure vessel inspection device according to an exemplary embodiment of the present disclosure includes: a monitoring sensor 100 including a filament 110 provided on an outer surface of a pressure vessel 10, a coating layer 120 applied onto an outer surface of the filament 110 so as to have an electrical physical quantity, and electrodes 130 connected to ends of the filament 110 and exposed to the outside; and a control unit 500 configured to measure structural health of the pressure vessel 10 based on the electrical physical quantity of the coating layer 120 in accordance with deformation of the pressure vessel 10.

The pressure vessel inspection device according to the exemplary embodiment of the present disclosure may be used to monitor structural health or structural safety of a test object (e.g., a pressure vessel) made of a fiber reinforced composite material, and the present disclosure is not limited or restricted by the type and the structure of the test object.

As an example, the pressure vessel inspection device according to the exemplary embodiment of the present disclosure may be used to inspect structural health of a hydrogen tank of a hydrogen storage system applied to a hydrogen vehicle.

The pressure vessel 10 may be variously changed in structure and shape in accordance with required conditions and design specifications, and the present disclosure is not limited or restricted by the structure and the shape of the pressure vessel 10.

Figure 2:
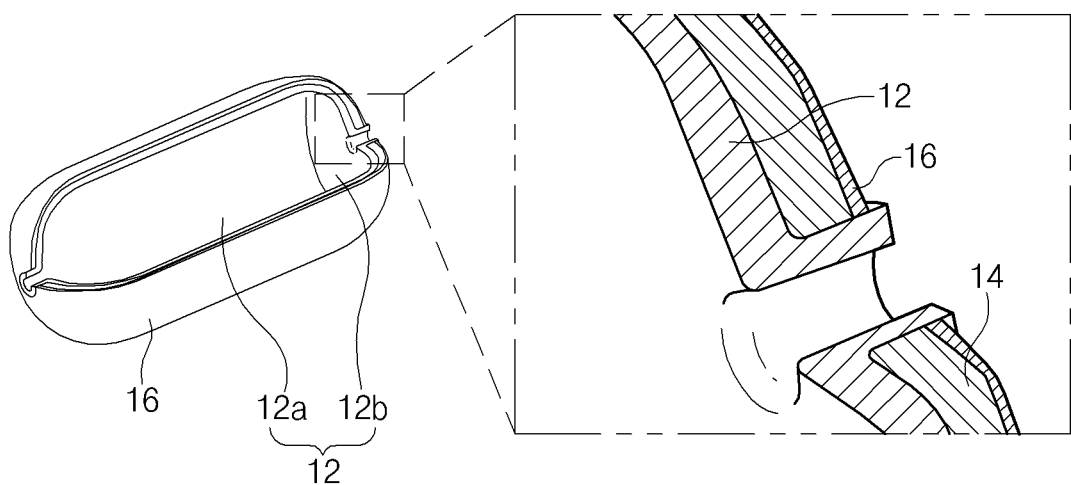
FIG. 2 is a view for explaining a pressure vessel related to the pressure vessel inspection device according to the present disclosure.

As an example, referring to FIG. 2, the pressure vessel 10 includes a liner 12, a carbon fiber layer 14 formed to surround an outer surface of the liner 12, and a fiberglass layer 16 formed to surround an outer surface of the carbon fiber layer 14.

The liner 12 has a hollow structure having a storage space therein, and high-pressure (e.g., 350 bar or 700 bar) hydrogen gas may be stored in the storage space.

An inlet port (not illustrated), through which hydrogen is introduced, may be formed at one end of the liner 12, and an outlet port (not illustrated), through which the hydrogen is discharged, may be formed at the other end of the liner 12.

The material of the liner 12 may be variously changed in accordance with required conditions and design specifications, and the present disclosure is not limited or restricted by the material of the liner 12. In particular, the liner 12 may be made of a nonmetallic material such as high-density plastic with excellent restoring force and excellent fatigue resistance.

The liner 12 may have various structures in accordance with required conditions and design specifications. As an example, the liner 12 includes a container-shaped body part 12a, and dome-shaped side parts 12b formed at both ends of the body part 12a.

In particular, the liner 12 may be formed in a hollow cylindrical shape, and the side parts 12b may be formed in a dome shape and integrally connected to both ends of the body part 12a.

The carbon fiber layer 14 is provided such that the pressure vessel 10 may withstand high pressure well, and the carbon fiber layer 14 is formed to surround the entire outer surface of the liner 12.

As an example, the carbon fiber layer 14 may be formed by winding a carbon fiber composite material around the outer surface of the liner 12, and the carbon fiber composite material may be made by impregnating a carbon fiber filament with epoxy, thermosetting resin, and the like.

The structure of the wound carbon fiber composite material and the method of winding the carbon fiber composite material may be variously changed in accordance with required conditions and design specifications, and the present disclosure is not limited or restricted by the method of winding the carbon fiber composite material. As an example, the carbon fiber layer 14 may be formed by winding multiple layers of the carbon fiber composite material around the outer surface of the liner 12 in various patterns (e.g., clockwise winding, counterclockwise winding, oblique winding, etc.).

The carbon fiber composite material wound around the outer surface of the liner 12 is cured through a subsequent heat treatment process, thereby forming the carbon fiber layer 14. As an example, the carbon fiber composite material wound around the outer surface of the liner 12 may be cured by performing the heat treatment at a temperature of 150° C. or higher for a predetermined time.

The fiberglass layer 16 is provided to define an antidamage layer for preventing damage to the pressure vessel 10 caused by external impact (e.g., scratches), corrosion, and the like, and the fiberglass layer 16 is formed to surround the entire outer surface of the carbon fiber layer 14.

As an example, the fiberglass layer 16 may be formed by winding a fiberglass composite material around the outer surface of the carbon fiber layer 14, and the fiberglass composite material may be formed by impregnating a fiberglass filament with epoxy, thermosetting resin, and the like.

A structure and a method for winding the fiberglass composite material may be variously changed in accordance with required conditions and design specifications, and the present disclosure is not limited or restricted by the method of winding the fiberglass composite material. As an example, the fiberglass layer 16 may be formed by winding multiple layers of the fiberglass composite material around the outer surface of the carbon fiber layer 14 in various patterns (e.g., clockwise winding, counterclockwise winding, oblique winding, etc.).

The fiberglass composite material wound around the outer surface of the carbon fiber layer 14 is cured through a subsequent heat treatment process, thereby forming the fiberglass layer 16. As an example, the fiberglass composite material wound around the outer surface of the carbon fiber layer 14 may be cured by performing the heat treatment at a temperature of 150° C. or higher for a predetermined time.

Figure 3:
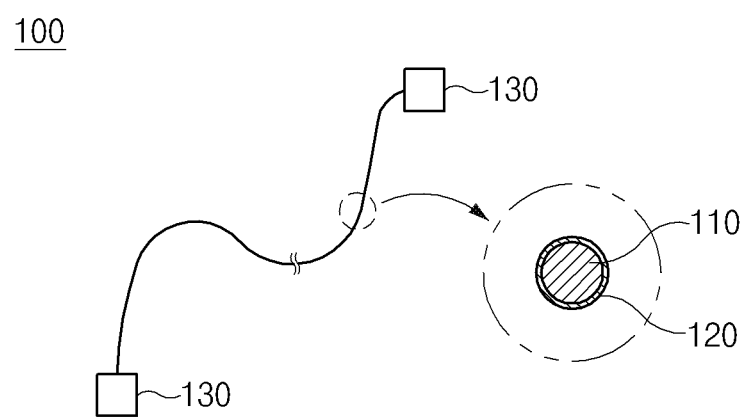
FIG. 3 is a view for explaining a structure of a monitoring sensor of the pressure vessel inspection device according to the present disclosure.

The monitoring sensor 100 is provided on the outer surface of the pressure vessel 10 in order to monitor the structural health of the pressure vessel 10. Referring to FIG. 3, the monitoring sensor 100 includes the filament 110 provided on the outer surface of the pressure vessel 10, the coating layer 120 applied onto the outer surface of the filament 110 so as to have an electrical physical quantity, and the electrodes 130 connected to the ends of the filament 110 and exposed to the outside.

The filament 110 is provided in the form of a wire capable of being wound around the outer surface of the fiberglass layer 16.

The material of the filament 110 may be variously changed in accordance with required conditions and design specifications. As an example, the filament 110 made of a fiberglass material identical or similar to that of the fiberglass filament, which constitutes the fiberglass layer 16, may be used as the filament 110 of the monitoring sensor 100.

The coating layer 120 is made of a material having an electrical physical quantity and formed to surround the entire outer surface of the filament 110.

In this case, the configuration in which the coating layer 120 has the electrical physical quantity may mean that the coating layer 120 has resistance or voltage within a predetermined range.

The coating layer 120 may be made of various materials with electrical physical quantities, and the present disclosure is not limited or restricted by the material of the coating layer 120. In particular, the coating layer 120 may be made of a metallic material.

As an example, constantan, nichrome, manganin, Karma (Ni+Cr+Al+Fe), Lsaclastic (Ni+Cr+Fe+Mo), pure nickel, platinum, soft iron, copper, and the like may be used as the material of the coating layer 120, or the coating layer 120 may be made of other metallic materials in accordance with required conditions and design specifications.

According to another exemplary embodiment of the present disclosure, the coating layer may be made of a conductive material which may be used to coat the filament (with which the outer surface of the filament may be coated).

In particular, the filament 110 including the coating layer 120 has constant specific resistance ρ per unit length.

The specific resistance ρ per unit length of the filament 110 including the coating layer 120 may be selectively adjusted by changing the type of metal that forms the coating layer 120 or adjusting the amount of metal.

More particularly, when the specific resistance ρ per unit length of the filament 110 including the coating layer 120 is constant, the resistance R of the filament 110 including the coating layer 120 is proportional to the length of the filament 110 and inversely proportional to a cross-sectional area of the filament 110.

That is, when the specific resistance of the filament 110 including the coating layer 120 is constant as ρ, the resistance R of the filament 110 including the coating layer 120 may be defined as R=ρL/A, in which A is the cross-sectional area and L is the length.

The electrodes 130 are connected to both ends of the filament 110, respectively, so as to be electrically connected to the coating layer 120.

The electrode 130 may be formed in the form of a pad or a terminal made of conductive paste, metal, or conductive plastic, and the present disclosure is not limited or restricted by the material and the shape of the electrode 130.

The electrodes 130 are exposed to the outside of the filament 110 in a state in which the electrodes 130 are connected to both ends of the filament 110. The exposed portion of the electrode 130 may be connected to a wire (not illustrated).

In particular, except for the exposed portion of the electrode 130 to which the wire is connected, the remaining portion of the electrode 130 is covered by the fiberglass layer 16 or the filament 110. As described above, since a part of the electrode 130 is covered by the fiberglass layer 16 or the filament 110, it is possible to obtain an advantageous effect of stably maintaining the arrangement state of the electrodes 130 and preventing the separation of the electrodes 130.

The filament 110 of the monitoring sensor 100 is provided to be extendable or contractible (changeable in length) in accordance with deformation of the pressure vessel 10, and the arrangement structure of the filament 110 may be variously changed in accordance with required conditions and design specifications.

Figure 4:
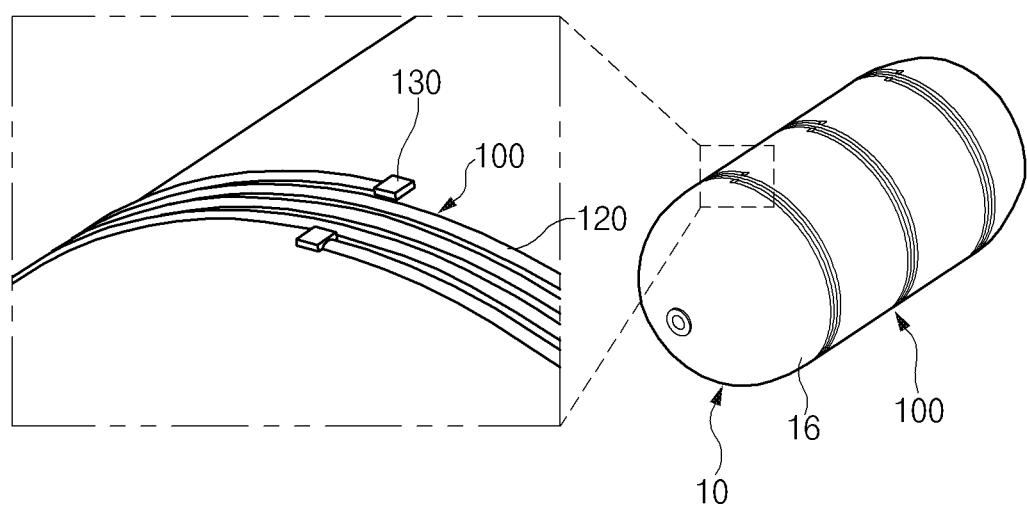
FIG. 4 is a view for explaining an example in which the monitoring sensor of the pressure vessel inspection device according to the present disclosure is mounted.

As an example, referring to FIG. 4, the filament 110 of the monitoring sensor 100 may be wound around the outer surface of the fiberglass layer 16 in a circumferential direction of the liner 12.

The number of filaments 110 wound around the outer surface of the fiberglass layer 16 and the spacing interval between the filaments 110 may be variously changed in accordance with required conditions and design specifications, and the present disclosure is not limited or restricted by the number of filaments 110 and the spacing interval between the filaments 110.

In particular, the filament 110 including the coating layer 120 may be wound at a point on the pressure vessel 10 at which maximum stress (e.g., circumferential stress (Hoop stress)) occurs.

As an example, the three filaments 110 each including the coating layer 120 may be wound around the outer surface of the fiberglass layer 16 so as to be spaced apart from one another in order to constitute the monitoring sensors 100 independent of one another. According to another exemplary embodiment of the present disclosure, two or less or four or more filaments may be wound around the outer surface of the fiberglass layer.

Further, sensing sensitivity of the monitoring sensor 100 may be controlled by adjusting the number of times the filament 110 of the monitoring sensor 100 is wound (the number of times the filament 110 is wound around the outer surface of the fiberglass layer 16).

For example, in the case of the pressure vessel 10 having a small amount of deformation caused by internal pressure, it is possible to improve the sensing sensitivity of the monitoring sensor 100 by increasing the number of times the filament 110 is wound around the outer surface of the fiberglass layer 16 (e.g., the number of windings is changed from three to five).

According to the exemplary embodiment of the present disclosure as described above, since the monitoring sensor 100 may be implemented by winding the filament 110 including the coating layer 120 around the outer surface of the pressure vessel 10, the monitoring sensor 100 may be flexibly applied in accordance with the structure of the pressure vessel 10 regardless of a shape and a size of the pressure vessel 10, thereby establishing an optimum monitoring environment.

Figure 5:
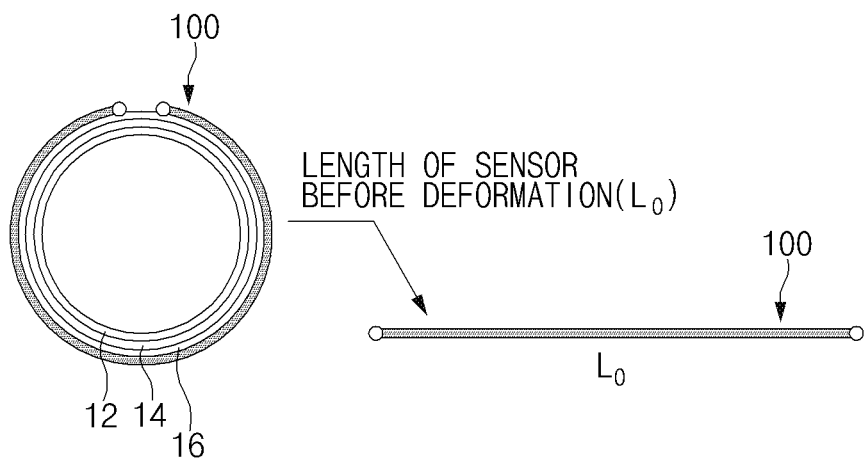
FIGS. 5 and 6 are views for explaining a state in which the monitoring sensor of the pressure vessel inspection device according to the present disclosure is deformed in accordance with deformation of the pressure vessel.
Figure 6:
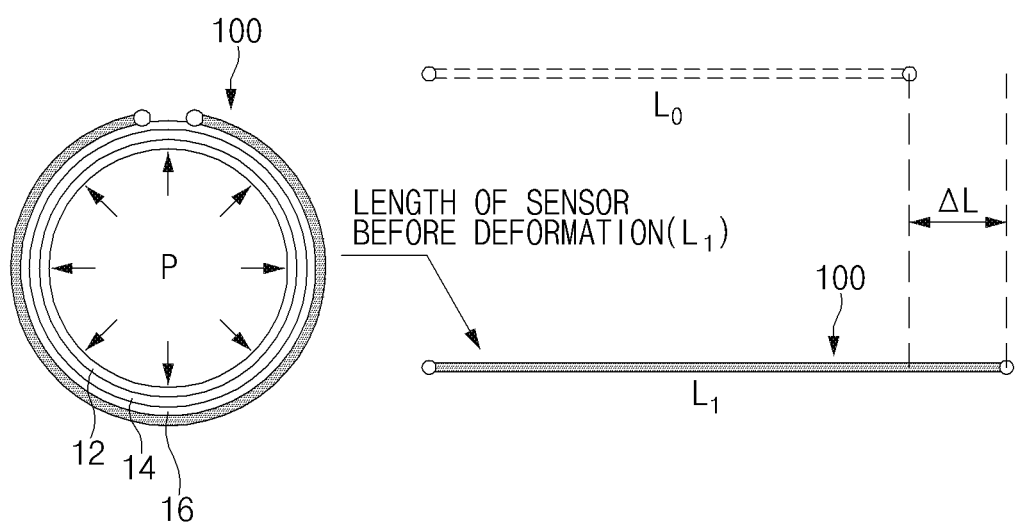

Referring to FIGS. 5 and 6, when the monitoring sensor 100 is attached to the surface of the pressure vessel 10 and then the pressure vessel 10 is deformed (e.g., expanded) by internal pressure P, the length of the monitoring sensor 100 may be increased ($L_0 \rightarrow L_1$) in accordance with the expansion of the pressure vessel 10, and a signal of resistance R in respect to the amount of change in length ΔL of the monitoring sensor 100 may be converted into a voltage signal by a typical conversion unit (not illustrated).

As an example, a Wheatstone bridge circuit may be used as the conversion unit. According to another exemplary embodiment of the present disclosure, a circuit such as a quarter bridge circuit or a full bridge circuit may be used as the conversion unit.

In addition, because output voltage outputted from the Wheatstone bridge circuit is very low, the output voltage may be amplified approximately 1,000 to 10,000 times by a typical amplifier (see 310 in FIG. 1), and noise contained in the voltage signal may be filtered out by a filter (see 320 in FIG. 1). Thereafter, the voltage signal is measured by a voltage measurement module (or a resistance measurement module) 400 (see FIG. 1) and then transmitted to the control unit 500.

Based on the electrical physical quantity (e.g., resistance or voltage) of the coating layer 120 in accordance with the deformation of the pressure vessel 10, the control unit 500 measures the structural health of the pressure vessel 10.

Figure 15:
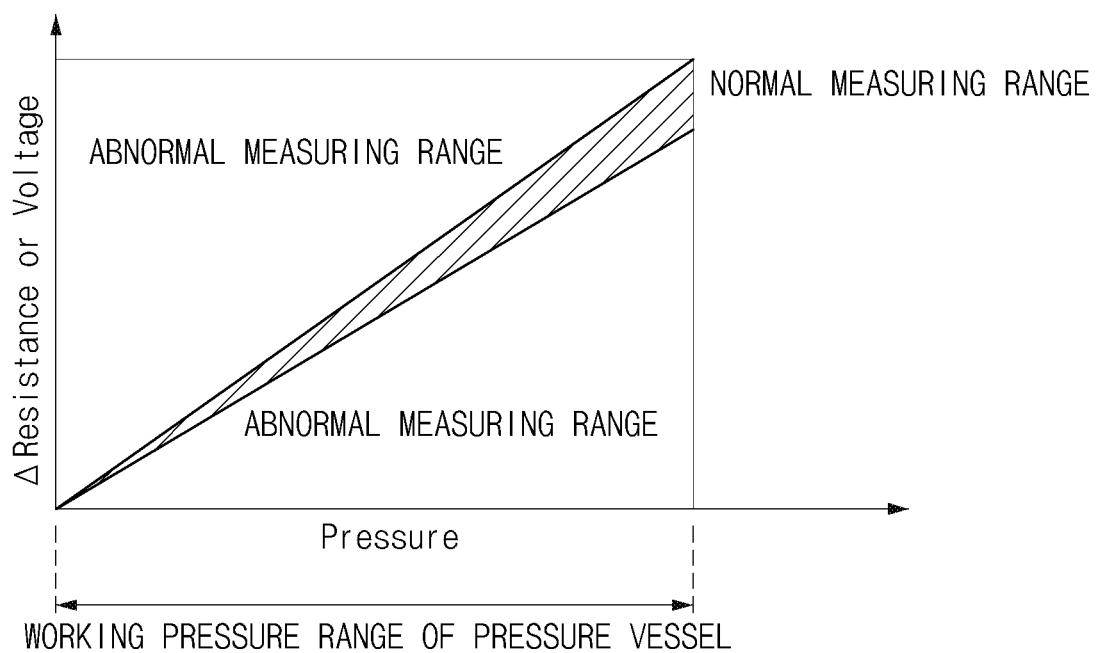
FIG. 15 is a view for explaining an example in which measurement is performed by the monitoring sensor of the pressure vessel inspection device according to the present disclosure.

For example, as illustrated in FIG. 15, when the resistance (or voltage) of the coating layer 120 in accordance with the deformation of the pressure vessel 10 is within a normal measuring range, the control unit 500 may determine that the structural health of the pressure vessel 10 is in a normal state. In contrast, when the resistance (or voltage) of the coating layer 120 in accordance with the deformation of the pressure vessel 10 is within an abnormal measuring range and deviates from the normal measuring range, the control unit 500 may determine that the structural health of the pressure vessel 10 is in an abnormal state. The control unit 500 of the apparatus according to an exemplary embodiment of the present disclosure may be a processor (e.g., computer, microprocessor, CPU, ASIC, circuitry, logic circuits, etc.).

According to the exemplary embodiment of the present disclosure, the pressure vessel inspection device may include internal sensors 200 configured to sense internal states (e.g., pressure or temperature) of the pressure vessel 10. As an example, the internal sensors 200 may include a pressure sensor 210 configured to sense an internal pressure of the pressure vessel 10, and a temperature sensor 220 configured to sense an internal temperature of the pressure vessel 10.

A typical pressure measurement sensor capable of sensing an internal pressure of the pressure vessel 10 may be used as the pressure sensor 210, and the present disclosure is not limited or restricted by the type and the property of the pressure sensor 210. In addition, a typical temperature measurement sensor capable of sensing an internal temperature of the pressure vessel 10 may be used as the temperature sensor 220, and the present disclosure is not limited or restricted by the type and the property of the temperature sensor 220.

A signal measured by the internal sensor 200 may be transmitted to the control unit 500. The control unit 500 may measure the structural health of the pressure vessel 10 based on both the signal sensed by the monitoring sensor 100 and the signal sensed by the internal sensor.

In addition, the signal sensed by the monitoring sensor 100 may be stored in a monitoring history storage unit 600. The monitoring history storage unit 600 may include various types of volatile or non-volatile storage media. For example, the monitoring history storage unit 600 may include a read only memory (ROM) and a random-access memory (RAM).

In addition, according to the exemplary embodiment of the present disclosure, the pressure vessel inspection device may include notification modules 700 configured to notify a driver or a manufacturer of a result measured by the control unit 500 (e.g., a result of measuring the structural health of the pressure vessel). As an example, the notification modules 700 may include a driver notification module 710, a network module 720, and a manufacturer notification module 730.

For example, the notification module 700 is a hardware device implemented as an electronic circuit in order to transmit and receive a signal through a wireless or wired connection. In the present disclosure, the communication may be performed in the vehicle via CAN communication, LIN communication, and the like.

Meanwhile, in the above-mentioned and depicted exemplary embodiment of the present disclosure, the configuration in which the filament 110 of the monitoring sensor 100 is wound around the outer surface of the fiberglass layer 16 is described as an example, but according to another exemplary embodiment of the present disclosure, a patch type filament may be attached to the outer surface of the pressure vessel.

Figure 7:
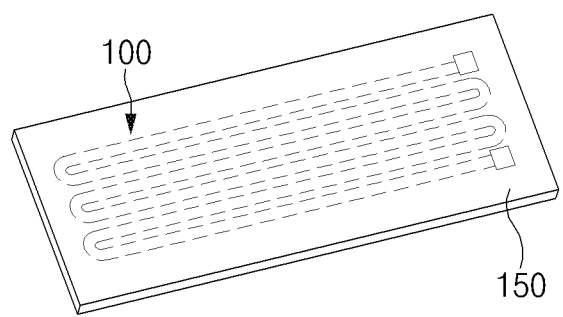
FIGS. 7 and 8 are views for explaining another exemplary embodiment of the monitoring sensor of the pressure vessel inspection device according to the present disclosure.
Figure 8:
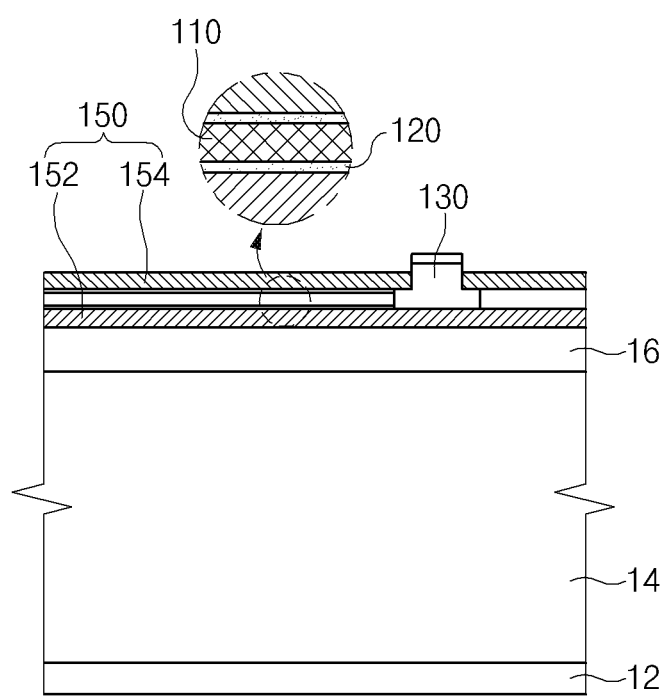

As an example, referring to FIG. 7, the filament 110 including the coating layer 120 is formed in a zigzag pattern and may be attached to the outer surface of the pressure vessel 10.

Figure 12:
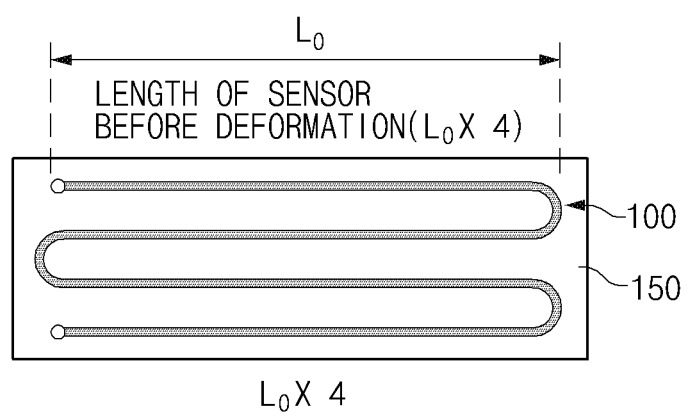
FIGS. 12 and 13 are views for explaining a state in which the monitoring sensor of the pressure vessel inspection device according to the present disclosure is deformed in accordance with deformation of the pressure vessel.

In particular, the filament 110 is formed in a zigzag pattern having a uniform straight length (see $L_0$ in FIG. 12).

In this case, the straight length of the filament 110 may be variously changed in accordance with required conditions and design specifications, and the present disclosure is not limited or restricted by the straight length of the filament 110.

In addition, the sensing sensitivity of the monitoring sensor 100 may be adjusted by increasing or decreasing the number of straight sections of the filament 110 having the zigzag pattern.

The filament 110 having the zigzag pattern may be attached to the outer surface of the pressure vessel 10 in various ways in accordance with required conditions and design specifications.

According to the exemplary embodiment of the present disclosure, the pressure vessel inspection device may include a prepreg patch 150 configured to be attached to the outer surface of the pressure vessel 10. The filament 110 may be provided on the prepreg patch 150 and attached to the outer surface of the pressure vessel 10 by the prepreg patch 150.

For reference, in the present disclosure, the prepreg patch 150 is defined as a composite intermediate-step material formed by allowing liquid synthetic resin such as epoxy resin to penetrate into a fiber-reinforced material such as carbon fiber and fiberglass. The prepreg patch 150 may be cured by heat and pressure and thus become a composite part excellent in mechanical and thermal properties.

The prepreg patch 150 may have various structures capable of being attached to the outer surface of the pressure vessel 10. As an example, referring to FIG. 8, the prepreg patch 150 includes first prepreg 152 attached to the outer surface of the pressure vessel 10, and second prepreg 154 superimposed on the first prepreg 152, and the filament 110 is interposed between the first prepreg 152 and the second prepreg 154 such that the electrodes 130 are exposed to the outside.

For example, each of the first prepreg 152 and the second prepreg 154 may be formed in the form of a quadrangular sheet. According to another exemplary embodiment of the present disclosure, each of the first prepreg and the second prepreg may be formed in a circular shape, an elliptical shape, or other shapes, and the present disclosure is not limited or restricted by the shapes of the first prepreg and the second prepreg.

The first prepreg 152 is attached to the outer surface of the pressure vessel 10, the filament 110 having the zigzag pattern is disposed on the outer surface of the first prepreg 152, and in this state, the second prepreg 154 is stacked on an outer surface of the first prepreg 152 so as to cover the filament 110.

A part of the electrode 130, which is connected to the end of the filament 110, may be partially exposed to the outside of the second prepreg 154, and a wire is connected to the exposed portion of the electrode 130.

In particular, the first prepreg 152 and the second prepreg 154 of the prepreg patch 150 are made of the same material as the fiberglass layer 16 and thermally cured together with the fiberglass layer 16 when the fiberglass layer 16 is thermally cured, such that the first prepreg 152 and the second prepreg 154 may be integrally attached to the outer surface of the fiberglass layer 16.

Since the prepreg patch 150 is made of the same material as the fiberglass layer 16 as described above, the prepreg patch 150 may perform the function of the monitoring sensor 100 while performing the function of the fiberglass layer 16 that maintains structural stability against the high pressure. According to another exemplary embodiment of the present disclosure, the prepreg patch and the fiberglass layer may be made of different materials.

The prepreg patch 150 including the filament 110 may be attached in various ways in accordance with required conditions and design specifications.

As an example, the prepreg patch 150 may be formed to partially cover the outer surface of the fiberglass layer 16 that corresponds to at least one of the outer surfaces of the body part and the side part that constitute the liner 12.

Figure 9:
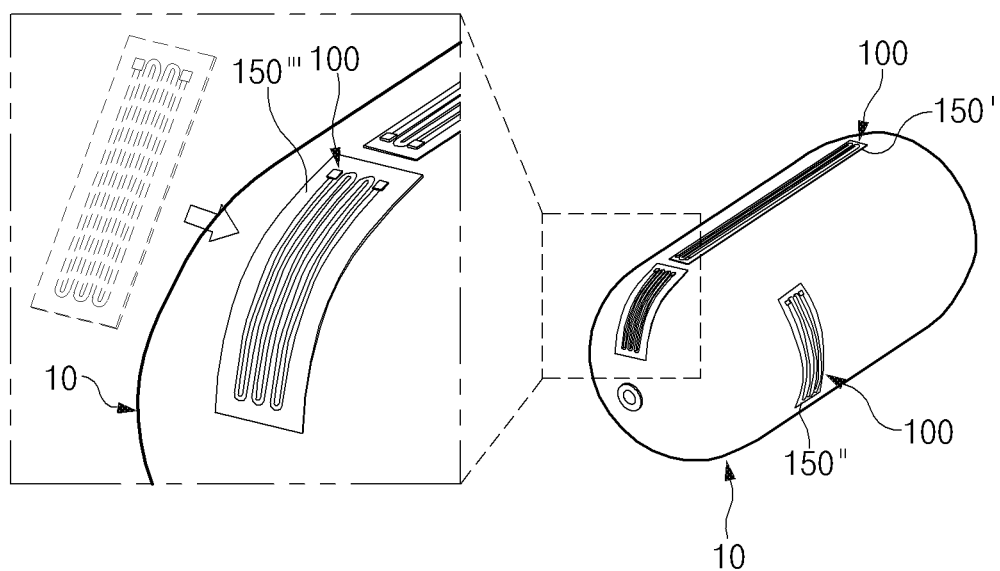
FIGS. 9 to 11 are views for explaining another example in which the monitoring sensor of the pressure vessel inspection device according to the present disclosure is mounted.

For example, referring to FIG. 9, a first prepreg patch 150' and a second prepreg patch 150" may be attached to the outer surface of the fiberglass layer 16 that corresponds to the outer surface of the body part, the first prepreg patch 150' is disposed in a longitudinal direction of the body part, and the second prepreg patch 150" is disposed in a circumferential direction of the body part. A third prepreg patch 150''' may be attached to the outer surface of the fiberglass layer 16 that corresponds to the outer surface of the side part. The third prepreg patch 150''' may be disposed along a curved surface of the side part.

The monitoring sensor 100 included in the first prepreg patch 150' may sense the deformation in a longitudinal direction of the pressure vessel 10 (expansion in length), the monitoring sensor 100 included in the second prepreg patch 150'' may sense the deformation in a diameter direction of the pressure vessel 10 (expansion in diameter), and the monitoring sensor 100 included in the third prepreg patch 150''' may sense the expansion in the longitudinal direction and the diameter direction of the pressure vessel 10.

According to another exemplary embodiment of the present disclosure, the prepreg patch 150 including the filament 110 may be formed to cover the entire outer surface of the fiberglass layer 16 that corresponds to the outer surface of the body part.

Figure 10:
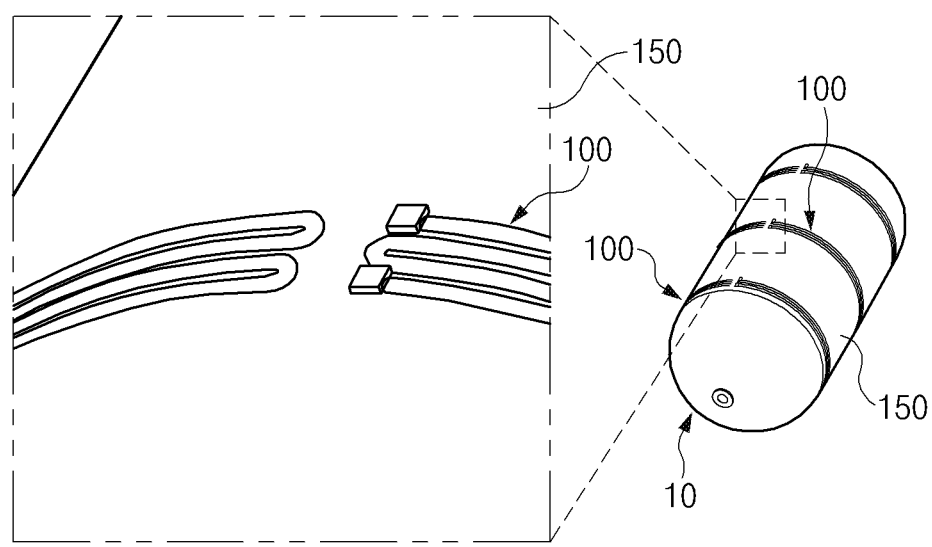
Figure 11:
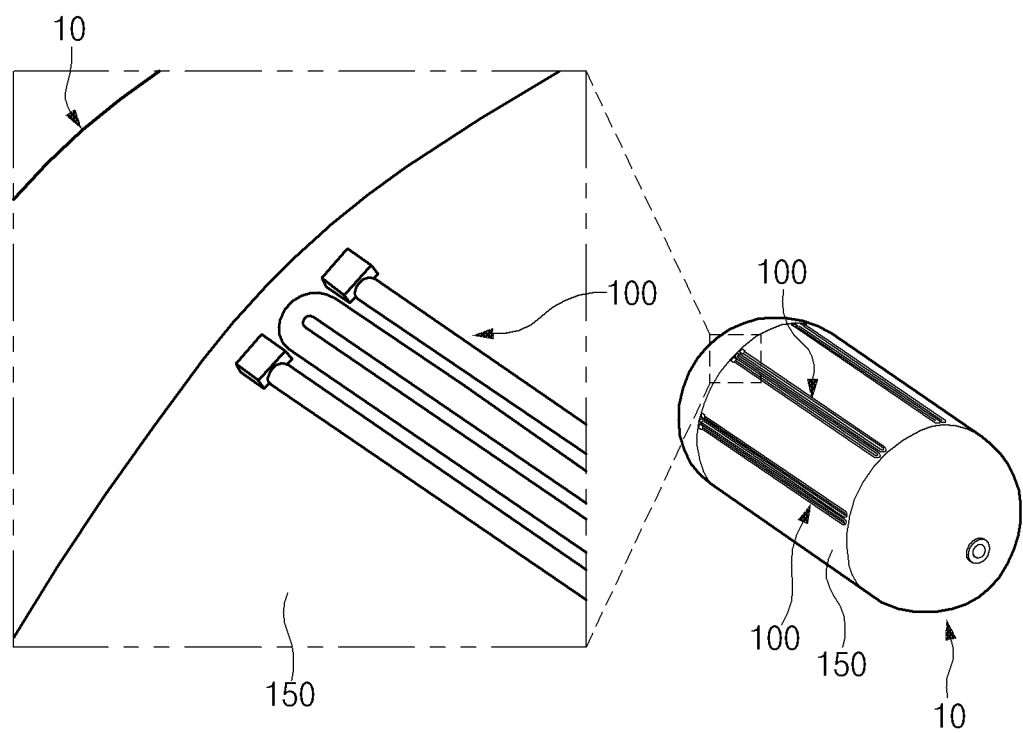

Referring to FIGS. 10 and 11, the prepreg patch 150 may be formed to have a length and a circumference that correspond to the outer surface of the body part, and the prepreg patch 150 may be disposed to cover the entire outer surface of the fiberglass layer 16 that corresponds to the outer surface of the body part.

In addition, the plurality of filaments 110 (the filament having the zigzag pattern), which each include the coating layer 120, may be disposed on the prepreg patch 150 so as to be spaced apart from one another, thereby constituting the independent monitoring sensors 100.

As an example, as illustrated in FIG. 10, the filament 110 provided on the prepreg patch 150 may be disposed to be wound around the outer surface of the fiberglass layer 16 in the circumferential direction of the liner 12 and may monitor the deformation of the pressure vessel 10 in the circumferential direction (diameter direction) of the pressure vessel 10.

As another example, as illustrated in FIG. 11, the filament 110 provided on the prepreg patch 150 may be disposed in the longitudinal direction of the liner 12 and may monitor the deformation of the pressure vessel 10 in the longitudinal direction of the pressure vessel 10.

Figure 13:
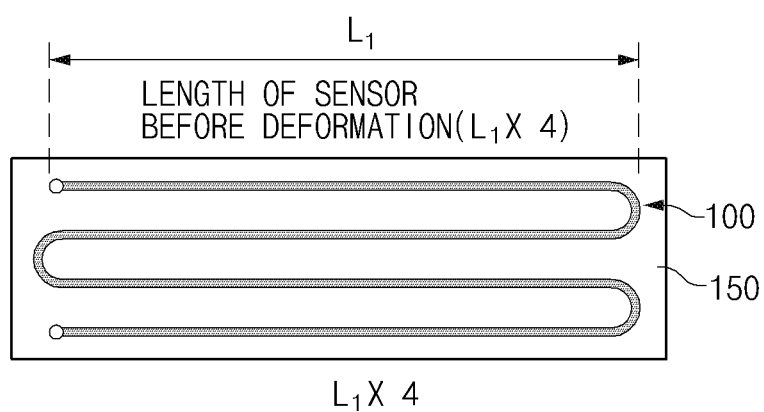

Referring to FIGS. 12 and 13, when the pressure vessel 10 is deformed (e.g., expanded) by internal pressure P, a length of the monitoring sensor 100 may be increased ($L_0 \times 4 \rightarrow L_1 \times 4$) in accordance with the expansion of the pressure vessel 10, and as a result, it is possible to monitor the structural health of the pressure vessel 10 based on a signal of resistance R (or a voltage signal) in respect to the amount of change in length ($\Delta L \times 4$) of the monitoring sensor 100.

Figure 14:
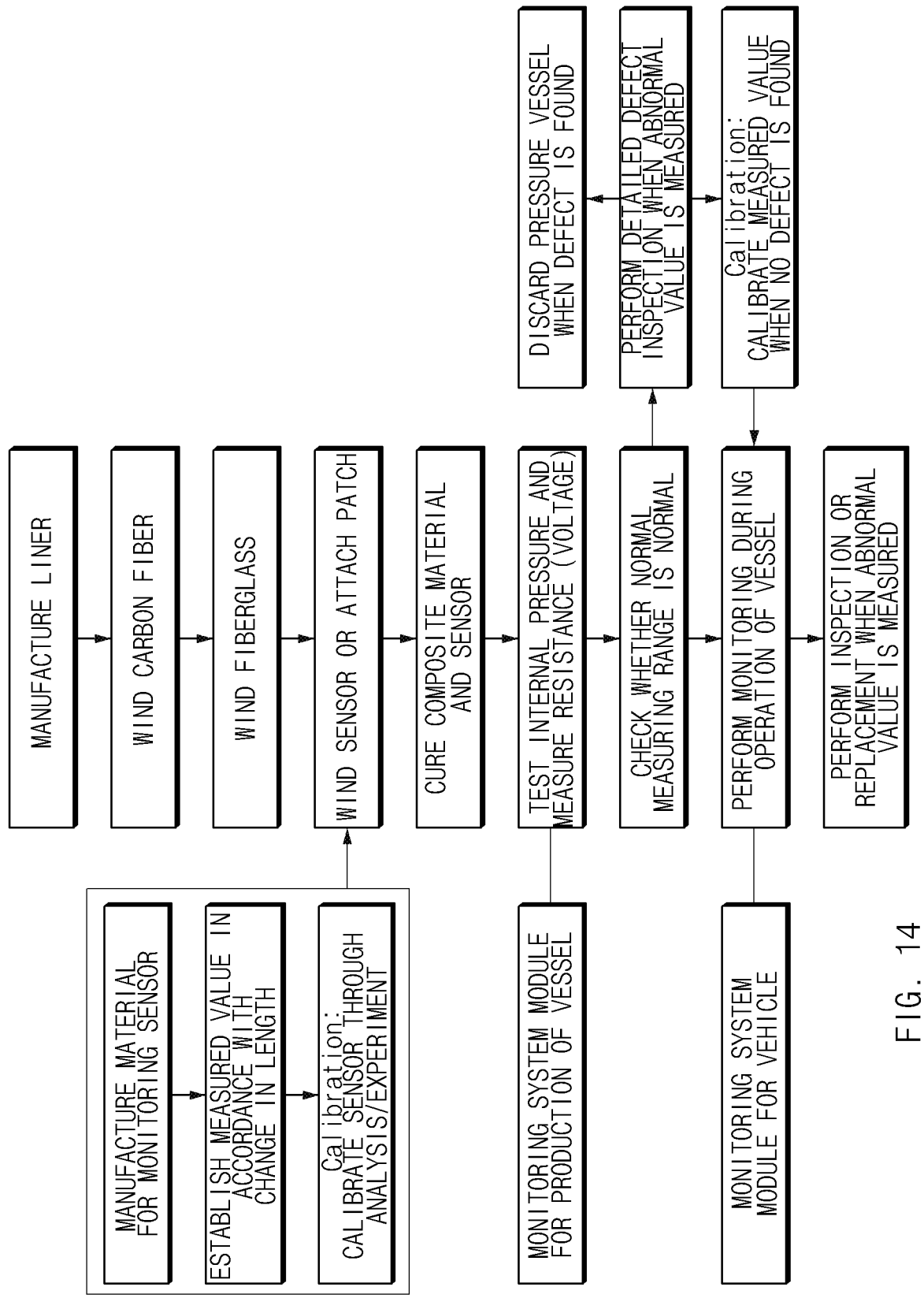
FIG. 14 is a view for explaining an operation mechanism of the pressure vessel inspection device according to the present disclosure.

Meanwhile, referring to FIG. 14, the monitoring sensor 100, which is optimized by analysis and experiments, may be mounted on the pressure vessel 10 by being wound around the pressure vessel 10 (see FIG. 4) or attached to the pressure vessel 10 by the prepreg patch 150 (see FIGS. 9 to 11). During an internal pressure test performed in a process of manufacturing the pressure vessel 10, whether the pressure vessel 10 (or the monitoring sensor) is defective may be checked by primarily checking a measured value (checking whether the resistance of the coating layer 120 is within the normal measuring range).

The pressure vessel 10 determined as being defective may be discarded or calibrated, and the pressure vessel 10 determined as being normal may be mounted in a vehicle.

In addition, when an abnormal value is detected (e.g., when the resistance of the coating layer 120 is within the abnormal measuring range and deviates from the normal measuring range) as a result of monitoring the structural health of the pressure vessel 10 while the vehicle is in operation, the pressure vessel 10 may be inspected or replaced.

According to the exemplary embodiment of the present disclosure as described above, the pressure vessel inspection device may be utilized for quality management to determine whether the pressure vessel 10 is defective, based on a resistance value (or a voltage value) established in the range of normal operating pressure, during a process of manufacturing the pressure vessel 10 in a production line for pressure vessel 10.

While the exemplary embodiments have been described above, but the exemplary embodiments are just illustrative and not intended to limit the present disclosure. It can be appreciated by those skilled in the art that various modifications and alterations, which are not described above, may be made to the present exemplary embodiment without departing from the intrinsic features of the present exemplary embodiment. For example, the respective constituent elements specifically described in the exemplary embodiments may be modified and then carried out. Further, it should be interpreted that the differences related to the modifications and alterations are included in the scope of the present disclosure defined by the appended claims.

According to the exemplary embodiment of the present disclosure as described above, it is possible to obtain an advantageous effect of accurately monitoring the structural health of the pressure vessel.

In addition, according to the exemplary embodiment of the present disclosure, it is possible to obtain an advantageous effect of monitoring, in real time, the structural health of the pressure vessel during a process of manufacturing the pressure vessel or during an operation of the vehicle.

In addition, according to the exemplary embodiment of the present disclosure, it is possible to obtain an advantageous effect of simplifying a structure and a manufacturing process and reducing costs.

In addition, according to the exemplary embodiment of the present disclosure, it is possible to obtain an advantageous effect of enabling the flexible application in accordance with the structure of the pressure vessel and establishing the optimum monitoring environment regardless of a shape and a size of the pressure vessel.

In addition, according to the exemplary embodiment of the present disclosure, it is possible to obtain an advantageous effect of improving safety and reliability and reducing a risk of occurrence of a safety accident.

In addition, according to the exemplary embodiment of the present disclosure, it is possible to obtain an advantageous effect of accurately predicting a lifespan of the pressure vessel and replacing the pressure vessel in a timely manner

What is claimed is:

1. A pressure vessel inspection device, comprising:
   a monitoring sensor comprising a filament provided on an outer surface of a pressure vessel, a coating layer applied onto an outer surface of the filament so as to have an electrical physical quantity, and electrodes connected to ends of the filament and exposed to outside;
   a control unit configured to measure structural health of the pressure vessel based on the electrical physical quantity of the coating layer in accordance with deformation of the pressure vessel; and
   a prepreg patch attached to the outer surface of the pressure vessel wherein the filament is provided on the prepreg patch, wherein the prepreg patch comprises:
a first prepreg attached to the outer surface of the pressure vessel; and
a second prepreg superimposed on the first prepreg, and wherein the filament is interposed between the first prepreg and the second prepreg so that the electrode are exposed to the outside.

2. The pressure vessel inspection device of claim 1, wherein the pressure vessel comprises a liner, a carbon fiber layer formed to surround an outer surface of the liner, and a fiberglass layer formed to surround an outer surface of the carbon fiber layer.

3. The pressure vessel inspection device of claim 2, wherein the prepreg patch is made of a same material as the fiberglass layer and thermally cured together with the fiberglass layer.

4. The pressure vessel inspection device of claim 2, wherein the liner comprises:
a container-shaped body part; and
dome-shaped side parts formed at both ends of the body part.

5. The pressure vessel inspection device of claim 4, wherein the prepreg patch is formed to partially cover an outer surface of the fiberglass layer that corresponds to at least one of outer surfaces of the body part and the side part.

6. The pressure vessel inspection device of claim 4, wherein the prepreg patch is formed to cover an entire outer surface of the fiberglass layer that corresponds to an outer surface of the body part.

7. The pressure vessel inspection device of claim 4, wherein the filament is disposed in a longitudinal direction of the body part or a circumferential direction of the body part.

8. A monitoring sensor comprising:
a filament provided on an outer surface of a test object;
a coating layer applied onto an outer surface of the filament so as to have an electrical physical quantity;
electrodes connected to ends of the filament and exposed to outside; and
a prepreg patch attached to the outer surface of the test object,
wherein the filament is provided on the prepreg patch,
wherein the prepreg patch comprises:
a first prepreg attached to the outer surface of the test object; and
a second prepreg superimposed on the first prepreg, and wherein the filament is interposed between the first prepreg and the second prepreg so that the electrodes are exposed to the outside.

9. The monitoring sensor of claim 8, wherein the filament is wound around the outer surface of the test object in a circumferential direction of the test object.

10. The monitoring sensor of claim 8, wherein the filament is provided in a zigzag pattern.

11. The monitoring sensor of claim 8, wherein the prepreg patch is provided to partially or entirely cover the outer surface of the test object.

* * * * *